United States Patent [19]
Buckenmaier

[11] Patent Number: 5,857,005
[45] Date of Patent: Jan. 5, 1999

[54] METHOD AND APPARATUS FOR SYNCHRONIZING TRANSFER OF DATA BETWEEN MEMORY CELLS

[75] Inventor: Karl C. Buckenmaier, Burlington, Mass.

[73] Assignee: VLSI Technology, Inc., San Jose, Calif.

[21] Appl. No.: 500,386

[22] Filed: Jul. 10, 1995

[51] Int. Cl.[6] ........................................ H04L 7/04

[52] U.S. Cl. ................ 375/357; 375/360; 326/93; 327/145; 327/153; 327/292; 365/189.05

[58] Field of Search ..................... 375/360, 354, 375/357, 355; 327/141, 144, 145, 146, 147, 149, 150, 153, 236, 292; 326/93, 94; 365/189.05, 221, 220, 233, 240, 189.01

[56] References Cited

U.S. PATENT DOCUMENTS 5,388,074    2/1995    Buckenmaier ................ 365/189.05

*Primary Examiner*—Chi H. Pham
*Assistant Examiner*—William Luther
*Attorney, Agent, or Firm*—Burns, Doane, Swecker & Mathis, L.L.P.

[57] ABSTRACT

The present invention is directed to a method and apparatus for synchronizing one or more data signal lines of a data bus to multiple clocks, and for guaranteeing the validity of the synchronized values. Exemplary embodiments avoid the need to eliminate delays between the asynchronous clocks. Thus, exemplary embodiments of the present invention can be used for reliably synchronizing the in-pointer and out-pointer of a first-in first-out memory.

15 Claims, 3 Drawing Sheets

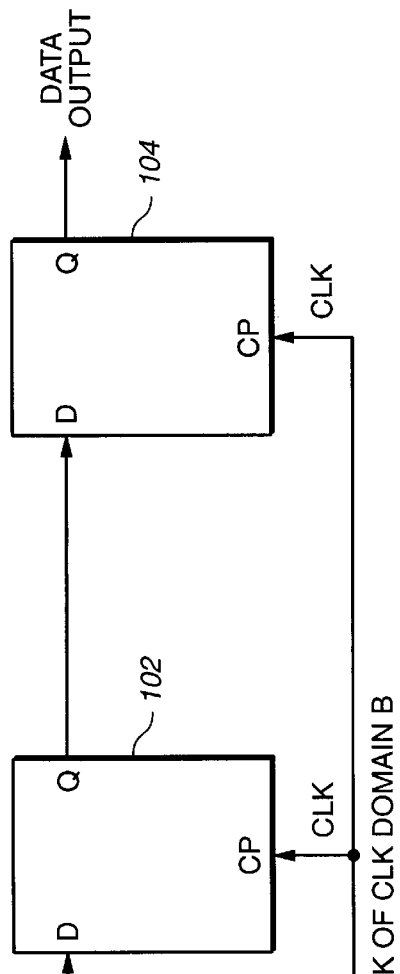
FIG._1 *(PRIOR ART)*
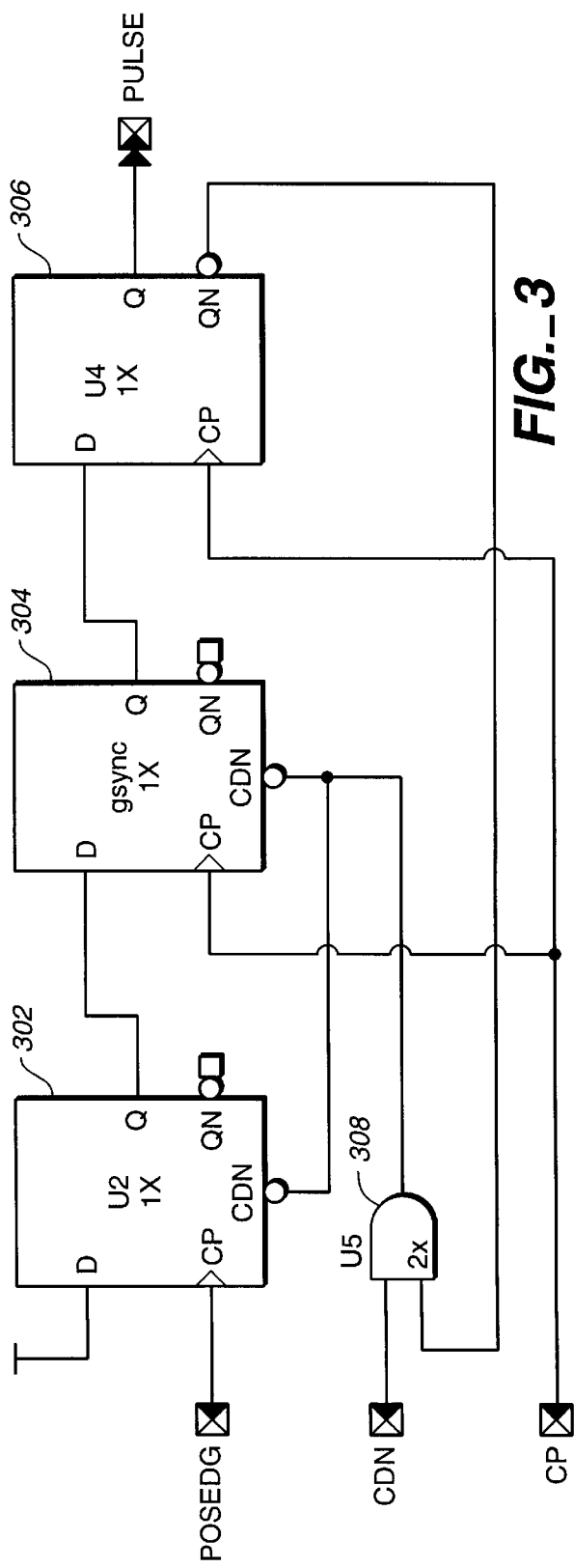
FIG._3

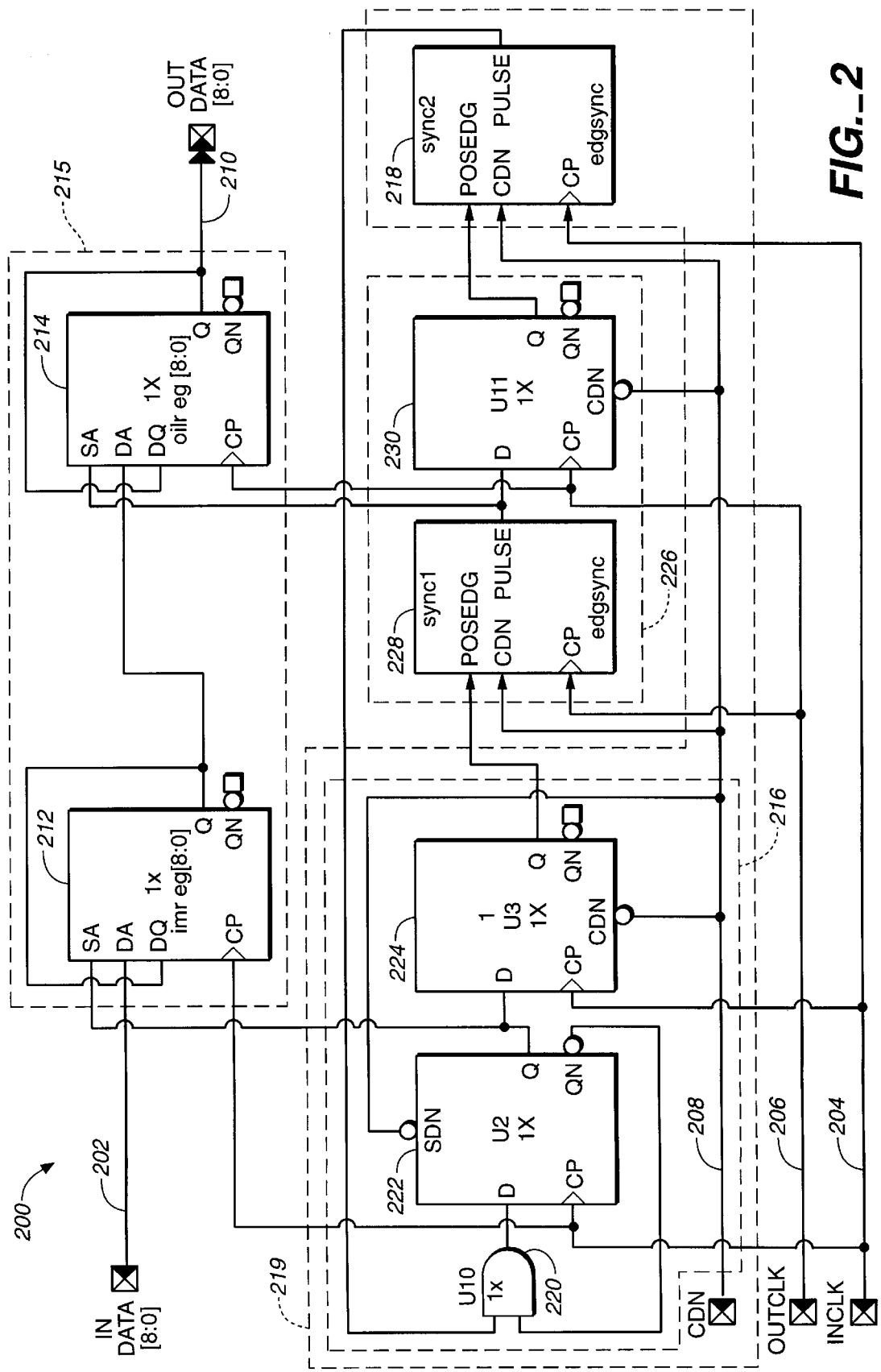
FIG._2

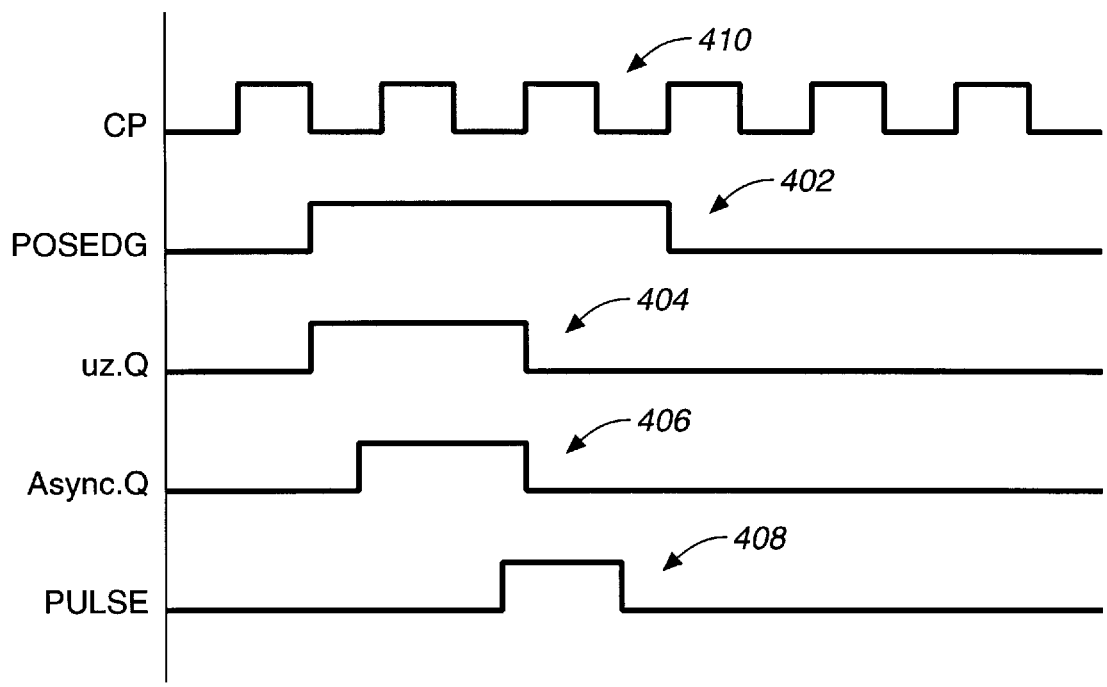
FIG._4

METHOD AND APPARATUS FOR SYNCHRONIZING TRANSFER OF DATA BETWEEN MEMORY CELLS

BACKGROUND OF THE INVENTION

1. Field of the Invention

The present invention is generally directed to the field of data processing, and more particularly, to ensuring the existence of valid data in systems controlled by multiple clock sources.

2. State of the Art

Systems which transfer data in response to asynchronous control signals (for example, multiple asynchronous clock sources) are known. One known circuit for synchronizing data in a system which includes multiple clock sources is illustrated in FIG. 1. The FIG. 1 circuit synchronizes data which has been received at a first clock rate to a second asynchronous clock rate.

The FIG. 1 circuit is configured using two serially connected flip-flops 102 and 104. Data is supplied to the first flip-flop 102, which can be a D flip-flop, from a first time domain "A" wherein data processing is performed at a first clock rate. Data supplied to the D input of the first flip-flop is held for one clock cycle of an asynchronous output clock source associated with a second time domain "B". The data is held at the Q output of the first flip-flop 102, and then clocked into the second flip-flop 104 on the next clock pulse of clock domain B.

The one clock cycle hold time is used to resolve meta-stabilities of the input data by producing a known value at the Q output of the first flip-flop. Assuming all such meta-stabilities are resolved, the data available at the Q output of flip flop 102 is clocked into the second flip-flop 104 using the clock signal of the second, asynchronous time domain. The Q output of the second flip-flop is thereby synchronized relative to the second time domain.

While the FIG. 1 synchronizing circuit can, in most cases, provide a known value at the output of the second flip-flop in synchronism with the second clock, this circuit suffers significant drawbacks. For example, it is assumed that the first flip-flop will have correctly latched the input data and that this data is available at the time an output clock signal occurs. However, it is possible that a transition of the data input will occur before a clock pulse is received at the first flip-flop 102. As a result, it is possible that the Q output of the first flip-flop 102 will not have been resolved from a meta-stable value.

Further, the FIG. 1 synchronizing circuit is only practical for a single data line controlled by two asynchronous clocks, and is not suitable for an entire data bus. This is because the FIG. 1 circuit only provides a fixed, predetermined time delay in which meta-stabilities can be resolved. As the number of bit lines is increased, the probability that all of the bit lines will be stable within the predetermined time period is statistically reduced. Thus, attempts to use a multiplicity of flip-flops for the plural bit lines of a data bus only increase the probability that invalid data will be present at the Q outputs of the first flip-flop in each bit line. The synchronizing circuit of FIG. 1 is therefore only practical for use with a single data line and is not suitable for an entire bus of signals.

The FIG. 1 synchronizing circuit would, for example, be unsuitable for comparing an in-pointer and an asynchronous out-pointer of a first-in first-out (FIFO) memory to determine the empty or full status of the memory. In a conventional first-in first-out memory, it is desirable to compare the in-pointer with the out-pointer to determine a status of the buffer's contents. Because the data input rate to the first-in first-out memory is independent of the data output rate, a comparison of the in-pointer and the out-pointer is used to track contents of the memory.

To track the current value of an in-pointer relative to the current value of an out-pointer, the in-pointer and the out-pointer are often configured using counters. The in-pointer counter is clocked by the input data rate and the out-pointer counter is clocked by the output data rate. Current values of these two counters are repeatedly compared to determine contents of the memory. Because the two counters are clocked by different clock signals (that is, an input data rate versus an output data rate), it is possible that a counter value associated with the in-pointer and/or the out-pointer will be read in transition.

For example, it is possible that where a binary value of "3" (i.e., 011) in a counter representing the current in-pointer value is changing to a count value of "4" (i.e., 100), an invalid value of 7 (i.e., 111) will be read during the transition period of the counter. This value of 7 will, of course, lead to processing errors. These processing errors can, and do result, when the multiple signal lines of the in-pointer counter are synchronized to the time domain of the out-pointer counter using a synchronizing circuit as illustrated in FIG. 1. Again, this deficiency in operation occurs because the FIG. 1 circuit cannot ensure that data meta-stabilities in circuits which use multiple, asynchronous clocks will be resolved.

Accordingly, it would be desirable to provide a synchronizing circuit which is not dependent on a predetermined time delay, for example, the clock period of clock domain B in FIG. 1, to resolve metal-stabilities in circuits where asynchronous data rates and/or clocks are included. Further, it would be desirable to resolve such meta-stabilities in a manner suitable for synchronizing an entire data bus to multiple asynchronous clocks.

SUMMARY OF THE INVENTION

Accordingly, the present invention is directed to a method and apparatus for synchronizing one or more data signal lines of a data bus to multiple asynchronous clocks, and for guaranteeing the validity of the synchronized values. Exemplary embodiments avoid the need to establish any predetermined delay for resolving meta-stabilities. Thus, exemplary embodiments of the present invention can, for example, be used to ensure valid data of an in-pointer associated with a first time domain will be available in a second time domain of an out-pointer for a first-in first-out memory. As a result, reliable values of the in-pointer and the out-pointer at a given point in time can be accurately compared.

In accordance with exemplary embodiments, a method and apparatus are provided for synchronizing data which is supplied at a first clock rate, to a second clock rate by storing data using at least first and second memory cells; controlling the clocking of data into the first memory cell; and controlling a transfer of data from the first memory cell into the second memory cell by inhibiting a reloading of data to said first memory cell until data stored in said first memory cell has been transferred to said second memory cell.

BRIEF DESCRIPTION OF THE DRAWINGS

The present invention can be further understood with reference to the following description and the appended drawings, wherein like elements are provided with the same reference numerals. In the drawings:

FIG. 1 illustrates a conventional synchronizing circuit;

FIG. 2 illustrates an exemplary embodiment of a synchronizing circuit in accordance with the present invention;

FIG. 3 illustrates an exemplary embodiment of an edge detection instance of the FIG. 2 embodiment; and FIG. 4 illustrates an exemplary timing diagram for the FIG. 3 instance.

DETAILED DESCRIPTION OF THE PREFERRED EMBODIMENTS

In the exemplary embodiment of a synchronizing circuit 200 illustrated in FIG. 2, input data is received via an input bus 202. While the input bus 202 is illustrated as being a 9-bit bus, those skilled in the art will appreciate that any number of signal lines can be included in the bus (for example, one or more lines). Further, those skilled in the art will appreciate that the input data on input bus 202 can be supplied from any source, including for example, user controlled inputs such as keyboard generated commands.

The synchronizing circuit 200 further includes clock inputs from two independent clock domains via a first, input clock (INCLK) signal line 204 and a second, output clock (OUTCLK) signal line 206. Those skilled in the art will appreciate that the signal lines 204 and 206 can be used to provide any input signals (that is, synchronous or asynchronous) which are used to clock data.

A reset signal line 208 which is illustrated as an active low (that is, logic level low) clear direct signal line labelled CDN is supplied to the synchronizing circuit 200. In the FIG. 2 embodiment, components which receive the clear direct signal at an active low clear direct input (that is, a clear direct NOT input labelled CDN) are cleared at circuit reset, while components which receive the active low clear direct signal at an active low set direct input (that is, a set direct NOT input labelled SDN) are set to a predetermined logic condition at circuit reset.

Data, the validity of which is guaranteed by the synchronizing circuit 200, is supplied from the synchronizing circuit via a data output signal line 210 labelled OUTDATA. Although the data output signal line is illustrated as a 9-bit bus, those skilled in the art will appreciate that, like the data input signal line, the output data line can include any number of signal lines.

The exemplary synchronizing circuit 200 of FIG. 2 further includes a means for storing data. For the given embodiment wherein the input data signal line and the output data signal line are 9-bit busses, first and second 9-bit memory cells 212 and 214 are provided. Each of the first and second memory cells is illustrated as a D flip-flop having a data signal input labelled DA, a second data signal input labelled DB, a clock signal input labelled CP and a select enable input labelled SA. Further, each of the first and second memory cells includes a non-inverted output labelled Q, and an inverted output labelled QN.

Those skilled in the art will appreciate that memory cells formed as D flip-flops with integrated select enable signal inputs are well known in the art and need not be described in greater detail. For example, an integrated AND gate or multiplexer can be used to logically combine the select enable signal input and the clock signal input such that data can not be loaded into the memory cell unless the select enable signal is in its active state at the time a clock pulse is received. Those skilled in the art will further appreciate that while the exemplary FIG. 2 embodiment is illustrated with the use of D flip-flops, any known storage device can be used, including any known latch or memory structure into which data can be written and read.

The FIG. 2 synchronizing circuit 200 further includes a means for controlling the input of data into the first memory cell 212. In the exemplary FIG. 2 embodiment, the input controlling means includes a delay circuit 216 and a positive edge detection circuit 218.

The synchronizing circuit 200 further includes a data transfer controlling means 226. The input controlling means and the data transfer controlling means form a free running circuit. The input controlling means controls the clocking of data via data input signal line 202 into the first memory cell 212. The data transfer controlling means controls the transfer of data from the first memory cell into the second memory cell 214 in a manner which ensures that only valid data will be transferred in synchronism with the output clock signal. That is, the exemplary FIG. 2 embodiment ensures the transfer of valid data into the second memory cell 214, such that valid data will be available at the output data signal line 210 in synchronism with the output clock signal.

To ensure a valid data output, the synchronizing circuit supplies the first clock signal of the first clock domain as the clock signal input to the first memory cell 212, and supplies the second clock signal of the second clock domain as the clock signal input to the second memory cell 214. In addition, the input controlling means generates a first select enable signal for the first memory cell 212 using the first clock signal, while the data transfer controlling means generates a second select enable signal for the second memory cell 214 using the second clock signal.

In the exemplary FIG. 2 embodiment, once the synchronizing circuit has been reset and operation begins, the data transfer controlling means is inhibited from generating the second select enable signal for the second memory cell 214 until after the first select enable signal has been generated by the input controlling means and supplied to the first memory cell 212. Similarly, after an initial select enable signal has been generated by the input controlling means for the first memory cell 212, a subsequent first select enable signal cannot be generated until after the data transfer controlling means has generated the second select enable signal for the second memory cell 214. The synchronizing circuit will now be described in greater detail. This operation guarantees the existence of reliable data for input to the second memory cell 214, and the existence of reliable data at the output of the second memory cell 214.

In the exemplary embodiment illustrated, the delay circuit 216 includes an AND gate 220 which supplies its output to the D data signal input of a flip-flop 222. The AND gate 220 receives a first input from the positive edge detection circuit 218 of the input controlling means, and receives a second input from the inverted Q output of the flip-flop 222.

The flip-flop 222 receives the output from AND gate 220 at its D signal input. At reset, the Q output of flip-flop 222 is set to a logic level high condition in response to the active low clear direct signal received at the active low set direct input labelled SDN. The flip-flop 222 is clocked by a clock signal on the input clock signal line 204 via a clock signal input CP. The Q signal output from the flip-flop 222 represents the first select enable signal which is supplied to the select enable signal input SA of the first memory cell 212. Further, the Q data output from flip-flop 222 is supplied to the D data signal input of a second flip-flop 224 included within the delay circuit 216.

The clock signal input labelled CP of the second flip-flop 224 is also clocked by the input clock signal on input clock signal line 204. Further, the reset signal on reset signal line 208 is applied to the clear direct input labelled CDN of the second flip-flop 224 to clear this flip-flop at reset. Once the first select enable signal for the first memory cell 212 has been set, the first select enable signal is latched in the second flip-flop 224 on a subsequent input clock signal pulse. Note that this subsequent input clock signal will reset the Q output of flip-flop 222 since the inverted Q output is tied back to its D input via AND gate 220. The Q output of the second flip-flop 224, which constitutes the latched first select enable signal, is supplied to the means for controlling a transfer of data from the first memory cell 212 into the second memory 214.

As illustrated in FIG. 2, the positive edge detection circuit 218 of the input controlling means is clocked at its clock input labelled CP by the input clock signal on input clock signal line 204. Further, the reset signal on the reset signal line 208 is supplied to the CDN input of the positive edge detection circuit 218. An input to the positive edge detection circuit is received at the signal input labelled POSEDG.

In operation, upon the receipt of a positive going edge at the input labelled POSEDG, and upon receipt of a clock signal at the clock signal input CP from the first clock signal input, the positive edge detection circuit supplies a pulse on an output signal line labelled PULSE. As mentioned previously, the output pulse from the positive edge detection circuit 218 is fed back to the first input of the AND gate 220 such that the AND gate 220 can produce a logic level high to flip-flop 222 and generate a subsequent select enable signal for the first memory cell 212. Because the positive edge detection circuit 218 cannot supply an output pulse until a positive edge is received from the data transfer controlling means 226, the positive edge detection circuit 218 therefore inhibits the input controlling means from supplying a subsequent select enable signal to the first memory cell 212 until after a data transfer from the first memory cell to the second memory cell 214.

Only after a data transfer from the first memory cell to the second memory cell has occurred is a positive output supplied from the data transfer controlling means to the positive edge detection circuit 218. At that time, an input is supplied via AND gate 220 to the first flip-flop 222. Recall that the Q data output of the flip-flop 222 was reset to a logic level low when the first select enable signal was clocked into the second flip-flop 224. Accordingly, the inverted Q output supplied to AND gate 220 will be logic level high when an output pulse is generated by the positive edge detection circuit 218.

Having described the input controlling means for selectively enabling the clocking of data into the first memory cell, attention will now be directed to the data transfer controlling means for selectively controlling the transfer of valid data from the first memory cell through the second memory cell 214. Tho data transfer controlling means, generally labelled 226, supplies the second select enable signal to the select enable signal input SA of the second memory cell 214. The data transfer controlling means as illustrated in FIG. 2 also includes a positive edge detection circuit 228, which is configured similar to that of positive edge detection circuit 218. The positive edge detection circuit 228 receives the Q output from the second flip-flop 224 of delay circuit 216 at its POSEDG data input. The positive edge detection circuit 218 is reset at its input labelled CDN via the reset signal line 208. The clock signal input labelled CP receives the output clock signal on the output clock signal line 206.

In operation, upon receipt of a positive going edge from the Q output of the delay circuit 216, and upon receipt of a clock pulse on the output clock signal line 206, a pulse is produced by the positive edge detection circuit 228. This pulse output is supplied as the second select enable signal to the select enable input of the second memory cell 214 and to the D data signal input of an output flip-flop 230.

The output flip-flop 230 includes an input labelled CDN which is driven by the reset signal line 208, and a clock input labeled CP receives a clock pulse from the output clock signal line 206. Thus, both the positive edge detection circuit 228 and the output flip-flop 230 are driven by the output clock signal.

In operation, when the positive edge detection circuit 228 detects a positive edge from the delay circuit 216, a pulse is supplied in synchronism with the output clock signal. At that time, the select enable signal input to the second memory cell 214 is active such that data can be transferred from the first memory cell 212 to the second memory cell 214 on the next output clock pulse.

During the time in which the second memory cell is awaiting an active select enable signal and an output clock signal on the output clock signal line 206, the first select enable signal cannot be supplied to first memory cell. Recall that a subsequent first select enable signal cannot be generated until after the second select enable signal has been generated and latched into the flip-flop 230.

Accordingly, additional data cannot be loaded into the first memory cell 212, and the output of the first memory cell cannot change state, until after previously stored contents of the first memory cell have been transferred to the second memory cell. Only after data from the first memory cell has been clocked into the second memory cell 214 is the Q output signal line from the output flip-flop 230 supplied to the POSEDG input of the positive edge detection circuit 218 to re-enable the loading of new data into the first memory cell 212. Thus, the first memory cell's output is stable and guaranteed, and meta-stable conditions will not exist. This inter-relationship between the input controlling means and the data transfer controlling means eliminates dependency of the synchronizing circuit on an estimated time delay between the input and output clock signals.

FIG. 3 illustrates an exemplary embodiment of the positive edge detection circuit instance (illustrated as elements 218 and 228 in FIG. 2). Referring to FIG. 3, each of the PCSEDG, clear direct signal CDN and clock signal CP are illustrated. Further, the output PULSE line is illustrated. Each positive edge detection circuit includes three flip-flops labeled 302, 304 and 306. Further, the positive edge detection circuit includes an AND gate 308.

An input to the edge detection circuit is supplied via the POSEDG input to the clock signal input of the first flip-flop 302 which serves to detect a pulse edge. The D data input of this flip-flop can be tied to a logic level high. An output of the flip-flop 302 is supplied to flip-flops 304 and 306 which provide a synchronization function.

More particularly, the output of flip-flop 302 is supplied to the D input of the second flip-flop 304. The second flip-flop 304 is clocked at its clock signal input CP. The Q output of the second flip-flop 304 is supplied to the D data input of the third flip-flop 306. The clock input CP of the third flip-flop is also clocked via its clock input CP. A Q data output from this third flip-flop 306 supplies the pulse output of the positive edge detection circuit.

The AND gate 308 of the FIG. 3 edge detection circuit is used for resetting the first and second flip-flops 302 and 304 in response to a reset signal or in response to an output pulse from flip-flop 306. More particularly, the AND gate 308 receives the clear direct signal from the active low reset signal line of the positive edge detection circuit. A second input of the AND gate 308 is connected to the inverse Q output of the third flip-flop 306. Because the reset signals for each of the flip-flops 302 and 304 are active low, these flip-flops are reset when a logic level high is supplied from the Q data output of the flip-flop 306 (that is, a logic level high on this Q output will drive the inverted Q output to a logic level low, which then drives the output of AND gate 308 low). Thus, the FIG. 3 edge detection circuit will ensure that the flip-flops 302 and 304 do not change state until after a pulse edge has been detected and supplied as an output from the edge detection circuit.

FIG. 4 illustrates an exemplary timing diagram for the positive edge detection circuit of FIG. 3. In response to a positive edge, pulse 408 is produced after the positive edge has been clocked through flip-flops 302 and 304, which produce Q data outputs 404 and 406, respectively. Note that output pulse 406 is produced in synchronism with the clock signal input 410.

Those skilled in the art will appreciate that the exemplary circuit described with respect to FIGS. 2 and 3 can be used in connection with any number of data lines. Further, those skilled in the art will appreciate that the exemplary embodiments described will ensure the stability of an output from the first memory cell 212 in FIG. 2, such that it can be accurately detected and supplied via the output data signal line 210. Note that such detection occurs at the expense of possibly missing the clocking in of some data from the input data line 202. However, such an expense is insignificant where, for example, the circuit is directed to ensuring the validity of data for a given point in time.

The accuracy of data at a given point in time is critical when, for example, the data represents values for the in-pointer and out-pointer of a first-in first-out memory. Here, the possibility that the amount of data stored in the FIFO may change between the time the in-pointer value is latched and the time the in-pointer value is compared with the out-pointer is not critical, since data is not lost (that is, it continues to be stored in the FIFO). For example, should the in-pointer jump from a value representing 6 entries in the first-in first-out memory to 9 entries during the time the in-pointer and the out-pointer are being compared, no data is actually lost, but is rather stored in the first-in first-out memory. However, each time the in-pointer and out-pointer counters are examined exemplary embodiments of the present invention ensure that they provide accurate values for the in-pointer and the out-pointer at a given point in time, thereby avoiding the potential for processing errors.

In summary, the data storing means provides a data path for the flow of data in response to control signals (that is, clock signals and select enable signals) from the free-running synchronizing circuitry. The input controlling means, which includes positive edge detection circuit 218, ensures that data is not loaded into the first memory cell 212 until after the positive edge detection circuit 228 has enabled the transfer of data from the first memory cell to the second memory cell 214. After data has been transferred to the out data bus 210, the entire process described above can be continuously repeated. Such operation ensures a clean, stable transfer of data from one clock domain to another.

As mentioned above, the present invention can be used for monitoring the in-pointer and out-pointer of a first-in first-out memory for checking full or empty conditions. If the read pointer of the first-in first-out memory (that is, the out-pointer) is synchronized to the write pointer (that is, the in-pointer) using the exemplary embodiment of FIG. 2, the lag on the value of the out-pointer will only result in a slightly longer time to recognize a "not full" condition. However, because of the guaranteed stability of the data, such a lag time is acceptable as it avoids the potential for a processing error.

Those skilled in the art will appreciate that the embodiments discussed above are by way of example only, and that alternate embodiments encompassed by the present invention can be implemented. For example, those skilled in the art will appreciate that instead of using both a clock signal and a select enable signal to latch data in the memory cells 212 and 214, the select enable signal could be used alone as the clock input. That is, the first select enable signal can be used as the clock input signal for the first memory cell, and the second select enable signal can be used as the clock input signal for the second memory cell. In such an embodiment, memory cells can be used which do not require separate clock and select enable inputs.

Further, those skilled in the art will appreciate that various components of the exemplary embodiment which enhance operation can be eliminated. For example, latching flip-flops can be added or deleted as necessary to accommodate a desired implementation. For example, additional latching flip-flops 222 and/or 224 can be eliminated since flip-flops are included within the positive edge detection circuit 228.

Those skilled in the art will also appreciate that a time-out, or watchdog, circuit can be included if desired. Such a time-out circuit can be used to, for example, generate a reset signal on clear direct signal line 208 if the first and/or second select enable signals are not generated within a predetermined time period.

Further, those skilled in the art will appreciate that the illustration of the FIG. 2 components in the larger functional blocks shown is by way of illustration only. The components of the exemplary embodiment can, of course, be reconfigured in any way desired, provided the functional relationship between the components is retained.

Further, those skilled in the art will appreciate that the exact signals processed in accordance with the present invention can be any signals used in data processing (e.g., any digital signals). For example, while the use of positive edge detection circuits were discussed, negative edge detection circuits can also be used.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Apparatus for synchronizing data supplied via a first clock rate to a second clock rate, comprising:

means for storing data, said data storing means having at least first and second memory cells;

means for controlling the clocking of data into said first memory cell, said clocking control means inhibiting a loading of a first set of data into said first memory cell until a second set of data has been transferred from said first memory cell to said second memory cell; and means for controlling a transfer of said second set of data from said first memory cell to said second memory cell, said transfer control means including at least one edge detector for receiving an output from said clocking control means.

2. Apparatus according to claim 1, wherein said data storing means includes at least first and second D flip-flops.

3. Apparatus according to claim 1, wherein said clocking control means further includes:
   at least one edge detector for receiving an output from said data transfer controlling means.

4. Apparatus according to claim 3, wherein said clocking control means further includes:
   at least one logic gate for receiving an output from said edge detector; and
   at least one storage cell for selectively producing an enable signal for enabling the storage of data into said first memory cell in response to an output from said logic gate.

5. Apparatus according to claim 4, wherein said clocking control means further includes:
   at least one additional storage cell for storing said enable signal.

6. Apparatus according to claim 5, wherein said clocking control means is controlled in response to a first clock signal of a first clock domain, while said transfer control means is controlled in response to a second clock signal of a second clock domain.

7. Apparatus according to claim 1, wherein said transfer control means further includes:
   at least one storage cell for storing an output from said edge detector, said output from said edge detector being supplied to said second memory cell as an enable signal for transferring an output of said first memory cell to an output of said second memory cell.

8. Apparatus according to claim 6, wherein said transfer control means further includes:
   at least one storage cell for storing an output from said edge detector, said output from said edge detector being supplied to said second memory cell as an enable signal for transferring an output of said first memory cell to an output of said second memory cell.

9. Apparatus for synchronizing data supplied via a first clock rate to a second clock rate, comprising:
   means for storing data, said data storing means having at least first and second memory cells;
   means for controlling the clocking of a first set of the data into said first memory cell; and
   means for controlling a transfer of the first set of the data from said first memory cell into said second memory cell by disabling the second memory cell until the first set of the data has been stored in said first memory cell, said transfer control means including at least one edge detector for receiving an output from said clocking control means.

10. Apparatus according to claim 9, wherein said data storing means includes at least first and second D flip-flops.

11. Apparatus according to claim 9, wherein said clocking control means further includes:
    at least one edge detector for receiving an output from said data transfer controlling means.

12. Apparatus according to claim 11, wherein said clocking control means further includes:
    at least one logic gate for receiving an output from said edge detector; and
    at least one storage cell for selectively producing an enable signal for enabling the storage of data into said first memory cell in response to an output from said logic gate.

13. Apparatus according to claim 12, wherein said clocking control means further includes:
    at least one additional storage cell for storing said enable signal.

14. Apparatus according to claim 13, wherein said clocking control means is controlled in response to a first clock signal of a first clock domain, while said transfer control means is controlled in response to a second clock signal of a second clock domain.

15. Apparatus according to claim 9, wherein said transfer control means further includes:
    at least one storage cell for storing an output from said edge detector, said output from said edge detector being supplied to said second memory cell as an enable signal for transferring an output of said first memory cell to an output of said second memory cell.

* * * * *